(12) United States Patent
Conn et al.

(10) Patent No.: US 7,409,408 B2
(45) Date of Patent: Aug. 5, 2008

(54) USING VIEWTYPES FOR ACCESSING INSTANCE DATA STRUCTURED BY A BASE MODEL

(75) Inventors: Sharon T. Conn, Scottsdale, AZ (US); Amy Marie Silberbauer, Modesto, CA (US); Philip L. Boyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 11/021,898

(22) Filed: Dec. 22, 2004

(65) Prior Publication Data
US 2006/0136805 A1 Jun. 22, 2006

(51) Int. Cl.
G06F 17/00 (2006.01)
G06F 7/00 (2006.01)
G06F 15/00 (2006.01)

(52) U.S. Cl. ............... 707/103 R; 707/102; 715/500
(58) Field of Classification Search ......... 707/103 R, 707/102; 715/500
See application file for complete search history.

(56) References Cited

U.S. PATENT DOCUMENTS

| | | | |
|---|---|---|---|
| 5,627,979 A * | 5/1997 | Chang et al. ............ 715/763 |
| 5,699,310 A | 12/1997 | Garloff et al. |
| 6,199,195 B1 | 3/2001 | Goodwin et al. |
| 6,289,382 B1 | 9/2001 | Bowman-Amuah |
| 6,292,932 B1 | 9/2001 | Baisley et al. |
| 6,477,527 B2 | 11/2002 | Carey et al. |
| 2001/0051948 A1 | 12/2001 | Srinivasan et al. |
| 2002/0184264 A1* | 12/2002 | Berg et al. ............... 707/513 |
| 2003/0058277 A1* | 3/2003 | Bowman-Amuah ...... 345/765 |
| 2003/0084424 A1* | 5/2003 | Reddy et al. ............. 717/105 |
| 2003/0110073 A1 | 6/2003 | Briel et al. |
| 2003/0135657 A1* | 7/2003 | Barker et al. ............. 709/310 |
| 2003/0149934 A1 | 8/2003 | Worden |
| 2003/0163479 A1* | 8/2003 | Mathews et al. .......... 707/102 |
| 2003/0208505 A1 | 11/2003 | Mullins et al. |

(Continued)

FOREIGN PATENT DOCUMENTS

EP 0 973 091 1/2000

(Continued)

OTHER PUBLICATIONS

Iyengar, Sridhar, et al., "Business Process Integration Using UML and BPEL4WS", SI-SE 2004, Zurich, Switzerland, Mar. 18-19, 2004, slides 1-60 (downloaded from: www.ifi.unizh.ch/groups/req/si-se/sise2004/Talk_Iyengar.pdf).*

(Continued)

Primary Examiner—John Breene
Assistant Examiner—Robert Stevens
(74) Attorney, Agent, or Firm—Janaki K. Darda; Konrad Raynes & Victor LLP

(57) ABSTRACT

Disclosed is a technique for manipulating instance data of a base model. A ViewType, a root object representing an object of the base model, and an operation are received. Whether the ViewType and the root object are compatible is determined. When the ViewType and the root object are compatible, the operation is applied to the instance data of the base model while using the ViewType to traverse the instance data.

15 Claims, 7 Drawing Sheets

U.S. PATENT DOCUMENTS

| | | | |
|---|---|---|---|
| 2004/0093344 A1* | 5/2004 | Berger et al. | 707/102 |
| 2004/0103393 A1* | 5/2004 | Reddy et al. | 717/122 |
| 2004/0216085 A1 | 10/2004 | Wilson et al. | |
| 2005/0050068 A1 | 3/2005 | Vaschillo et al. | |
| 2005/0108684 A1* | 5/2005 | Sohn et al. | 717/120 |
| 2006/0136482 A1 | 6/2006 | Conn et al. | |
| 2006/0136804 A1 | 6/2006 | Boyer et al. | |

FOREIGN PATENT DOCUMENTS

| | | |
|---|---|---|
| WO | WO-01/16668 | 3/2001 |
| WO | WO-01/16704 | 3/2001 |
| WO | WO-01/16705 | 3/2001 |
| WO | WO-01/16706 | 3/2001 |
| WO | WO-01/16723 | 3/2001 |
| WO | WO-01/16724 | 3/2001 |
| WO | WO-01/16726 | 3/2001 |
| WO | WO-01/16727 | 3/2001 |
| WO | WO-01/16728 | 3/2001 |
| WO | WO-01/16729 | 3/2001 |
| WO | WO-01/16733 | 3/2001 |
| WO | WO-01/16734 | 3/2001 |
| WO | WO-01/16735 | 3/2001 |
| WO | WO-01/16739 | 3/2001 |
| WO | WO-01/17194 | 3/2001 |
| WO | WO-01/17195 | 3/2001 |

OTHER PUBLICATIONS

Budinsky, Frank, et al., "WebSphere Overview", IBM Systems Journal, vol. 43, No. 2, May 6, 2006 (Internet Publication), pp. 384-419.*

Brown, Alan, "An Introduction to Model driven Architecture. Part I: MDA and today's systems", The Rational Edge, Feb. 17, 2004, pp. 1-15 (downloaded from: www.ibm.com/developerworks/rational/library/3100.html).*

Atkinson, Colin, et al., "Model-Driven development: A Metamodeling Foundation", IEEE Software, vol. 20, Issue 5, Sep./Oct. 2003, pp. 37-41.*

Kühn, Harald, et al., "Enterprise Model Integration", LNCS, vol. 2738/2003, Oct. 8, 2003, pp. 379-392.*

Rayside, Derek, et al., "Visualizing Flow Diagrams in WebSphere Studio Using SHriMP Views", Information Systems Frontiers, Springer Netherlands, vol. 5, No. 2, Apr. 2003, pp. 161-174.*

Braganholo, Vanessa P., et al., "Propagating XML View Updates to a Relational Database", UFRGS Technical Report No. RP-341, Porto Alegre, Brazil, Feb. 2004, pp. 1-31.*

Braganholo, Vanessa P., et al., "Reasoning About the Updatability of XML Views Over Relational Databases", Univ. of Pennsylvania Dept. of Computer and Information Science Technical Report No. MS-CIS-03-13, Philadelphia, PA, © 2003, pp. i and 1-17.*

Bézivin, Jean, et al., "Towards a True Reflective Modeling Scheme", Reflection and Software Engineering, LNCS 1826, Springer-Verlag, Berlin, Germany, © 2000, pp. 21-38.*

Boger, Marko, et al., "Diagram Interchange for UML", UML 2002, LNCS 2460, Springer-Verlag, Berlin, Germany, © 2002, pp. 398-411.*

Kovacs, Z., et al., "Patterns for Integrating Manufacturing Product and Process Models", EDOC '99, Mannheim, Germany, Sep. 27-30, 1999, pp. 37-48.*

Cooperative Research Centre for Distributed Systems Technology (DSTC), "Meta-Object Facility", [online], Jan. 17, 1997, [Retrieved on Oct. 12, 2001]. Retrieved from the Internet at <URL: http://www.dstc.edu.au/Research/Projects/MOF/Publications/OMG/MOF/dstc_mof.pdf>.

Egyed, A., "Integrating Architectural Views in UML", *Technical Report*, [online], Mar. 10, 1999, [Retrieved on Oct. 12, 2001]. Retrieved from the Internet at <URL: http://sunset.usc.edu/publications/techrpts/1999/useese99-514/usccse99-514.pdf>.

Felsinger, R., "UML Project Plan", [online], Jan. 29, 2001, [Retrieved on Oct. 12, 2001]. Retrieved from the Internet at <URL: http://www.felsinger.com/downloads/UMLProjectPlan.pdf>.

Lagerweu, W., "Design of an Object Oriented Framework Using the Unified Modeling Language", [online], [Retrieved on Oct. 12, 2001]. Retrieved from the Internet at <URL: http://www.euronet.bl/-wouterla/thesis/scriptie/thesis.html>.

Object Management Group (OMG), "Common Warehouse Metamodel (CWM) Specification", [online], Feb. 11, 2000, [Retrieved on Oct. 12, 2001]. Retrieved from the Internet at <URL: http://www.omg.org/docs/ad/00-01-01.pdf>.

Braganholo, V.P., S.B. Davidson, and C.A. Heuser, "From XML View Updates to Relational View Updates: Old Solutions to a Nwe Problem", In the Proceedings of the 30th VLDB Conference, 2004, pp. 276-287.

Mishra, S., and A. Beaulieu, "Mastering Oracle SQL," O'Reilly & Associates, Sebastopol, CA, Apr. 2002, pp. 1-2, 14-18, 43-54, 77-78, and 159-162.

* cited by examiner ions of the invention.

USING VIEWTYPES FOR ACCESSING INSTANCE DATA STRUCTURED BY A BASE MODEL

CROSS-REFERENCE TO RELATED APPLICATIONS

This application is related to the following commonly assigned and co-pending, United States Patent Applications:

U.S. patent application Ser. No. 11/021,730, entitled "DEFINING AND GENERATING A VIEWTYPE FOR A BASE MODEL," by S. Conn, et al.; and U.S. patent application Ser. No. 11/021,796, entitled "GENERATING A RELATIONAL VIEW FOR A BASE MODEL SCHEMA," by P. Boyer et al., each of which is filed on the same date herewith, and which is incorporated by reference herein in its entirety.

BACKGROUND

1. Field

The present invention is related to using ViewTypes for accessing and operating on instance data structured by a base model.

2. Description of the Related Art

An Essential Meta-Object Facility (EMOF) specification describes a framework for describing and representing metadata (i.e., data describing other data). The EMOF specification provides EMOF model constructs that enable creation of metadata models. A metadata model includes objects described by EMOF classes (defined by the EMOF model), links that connect objects described by EMOF associations, and data values. An EMOF class may include a class name, attributes, operations, association references, and other elements. An association reference enables an EMOF object to be "aware" of being in a relationship with other objects via an association, and the relationship links may be navigated or traversed to get to other data in the model (e.g., to perform operations on objects in a metadata model). An EMOF class may inherit characteristics (e.g., attributes, operations, etc.) from other EMOF classes.

Unified Modeling Language (UML) is a notational language for specifying and visualizing software, (e.g., object-oriented projects) and was developed by the Object Management Group (OMG). An EMOF metadata model may be represented using a UML model. For more information regarding EMOF and UML, see the World Wide Web, omg.org.

When defining an EMOF-based model in a relational database, the resulting relational database schema needed for representing the EMOF-based model may be substantially complex. Consequently, dealing with instance data for classes of the model can also be very complicated.

Thus, there is a need in the art for more simply defining and using an EMOF-based model.

SUMMARY OF THE INVENTION

Provided are a method, system, and program for manipulating instance data of a base model. The manipulation may include reading, updating, saving or deleting, instance data within the scope of the ViewYype definition. A ViewType, a root object representing an object of the base model, and an operation are received. Whether the ViewType and the root object are compatible is determined. When the ViewType and the root object are compatible, the operation is applied to the instance data of the base model while using the ViewType to traverse the instance data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the invention. It is understood that other implementations may be utilized and structural and operational changes may be made without departing from the scope of implementations of the invention.

Figure 1:
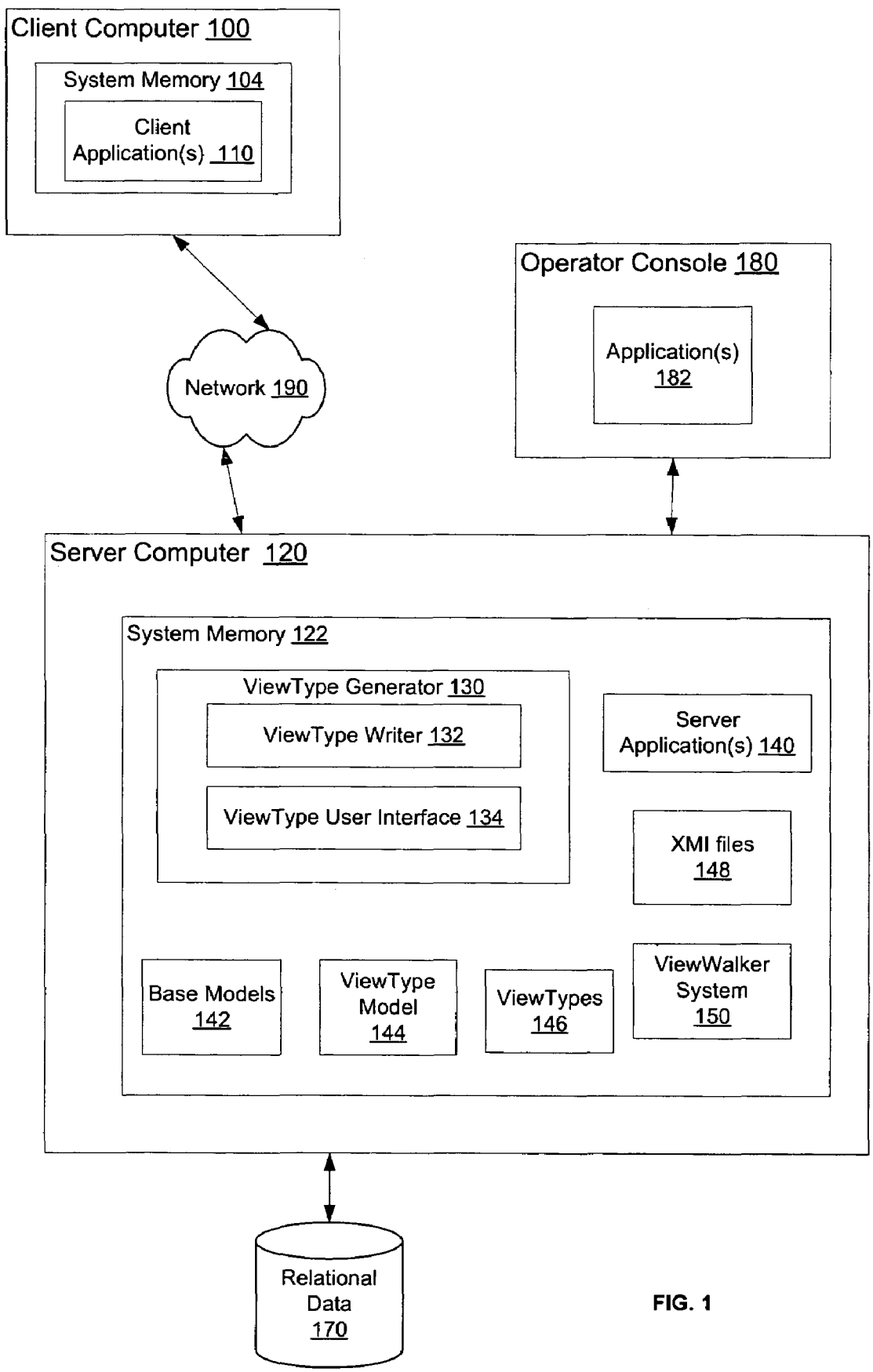
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 includes system memory 104, which may be implemented in volatile and/or non-volatile devices. One or more client applications 110 may execute in the system memory 104.

The server computer 120 includes system memory 122, which may be implemented in volatile and/or non-volatile devices. System memory 122 may store base models 142, a ViewType model 144, and ViewTypes 146. A ViewType 146 uses a base model (i.e., a subset of the base model or the base model in its entirety). For example, a ViewType 146 that uses the base model in its entirety may be referred to as a comprehensive ViewType. A ViewType 146 references classes, attributes, and associations of a base model 142 (i.e., either a subset or in its entirety) as ViewType objects. For example, a ViewType 146 uses parts of a base model 142 by naming classes from the base model. ViewType objects of a ViewType 146 may be defined by a ViewType model 144.

A ViewType generator 130 executes in the system memory 122 and generates a ViewType 146 from a base model 142. The ViewType 146 is built using the ViewType model 144. The base model 142 and the ViewType 146 may be represented with respective XML Metadata Interchange (XMI) files 148. In certain implementations of the invention, the ViewType generator 130 includes two subcomponents: a ViewType writer 132 and a ViewType user interface 134. The ViewType generator 130, XMI files 148, ViewType writer 132, and ViewType user interface 134 are described in further detail in the above cross-referenced patent application with U.S. patent application Ser. No. 11/021,730, entitled "DEFINING AND GENERATING A VIEWTYPE FOR A BASE MODEL," by S. Conn, et al.

XML Metadata Interchange (XMI) was proposed by the Object Management Group (OMG) and uses Extensible Markup Language (XML) to exchange information about metadata. XMI helps programmers using the Unified Modeling Language (UML) with different languages and development tools to exchange their data models with each other. The XMI format standardizes how any set of metadata is described and enables users across many industries and operating environments to see data the same way.

The ViewType writer 132 is used to create ViewType 146 objects based on a base model 142 designated by the user. The ViewType writer 132 validates ViewType objects against the classes, attributes, and associations declared in an EMOF-based model. The ViewType writer 132 writes the correctly formatted and validated ViewType to an XMI file 148. The ViewType writer 132 can also build a comprehensive ViewType of a base model 142 starting at a user-specified root class and recursively including all attributes, associations, and related classes.

The ViewType user interface 134 allows a user to graphically build and maintain a valid ViewType 146 based on classes defined in a user-specified base model 142 (e.g., EMOF-based models) and/or from an existing ViewType. From the ViewType user interface 134, a user is also provided with facilities for nesting ViewTypes, which avoids redundant definitions of ViewType branches, and for referring to "proxy" classes, which may define instance data, at runtime, that is manipulated by other ViewTypes. One or more server applications 140 execute in system memory 122 A ViewType user interface 134 is a type of Graphical User Interface (GUI) and may be displayed at the client computer 100 by the ViewType generator 130.

A ViewType Walker system 150 executes in the system memory 212 and allows an application (e.g., a client application 110 ) to traverse instance data of a base model, visiting the objects of the base model in a traversal path designated by the structure of a ViewType. A ViewType may be referred to as a "map" that is used to traverse the objects of the base model.

The server computer 120 provides the client computer 100 with access to data in a relational data store 170 An operator console 180 executes one or more applications 182 and is used to access the server computer 120

The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The relational data store 170 may comprise an array of storage devices, such as Direct Access Storage Devices (DASDs), Just a Bunch of Disks (JBOD), Redundant Array of Independent Disks (RAID), virtualization device, etc.

Figure 2:
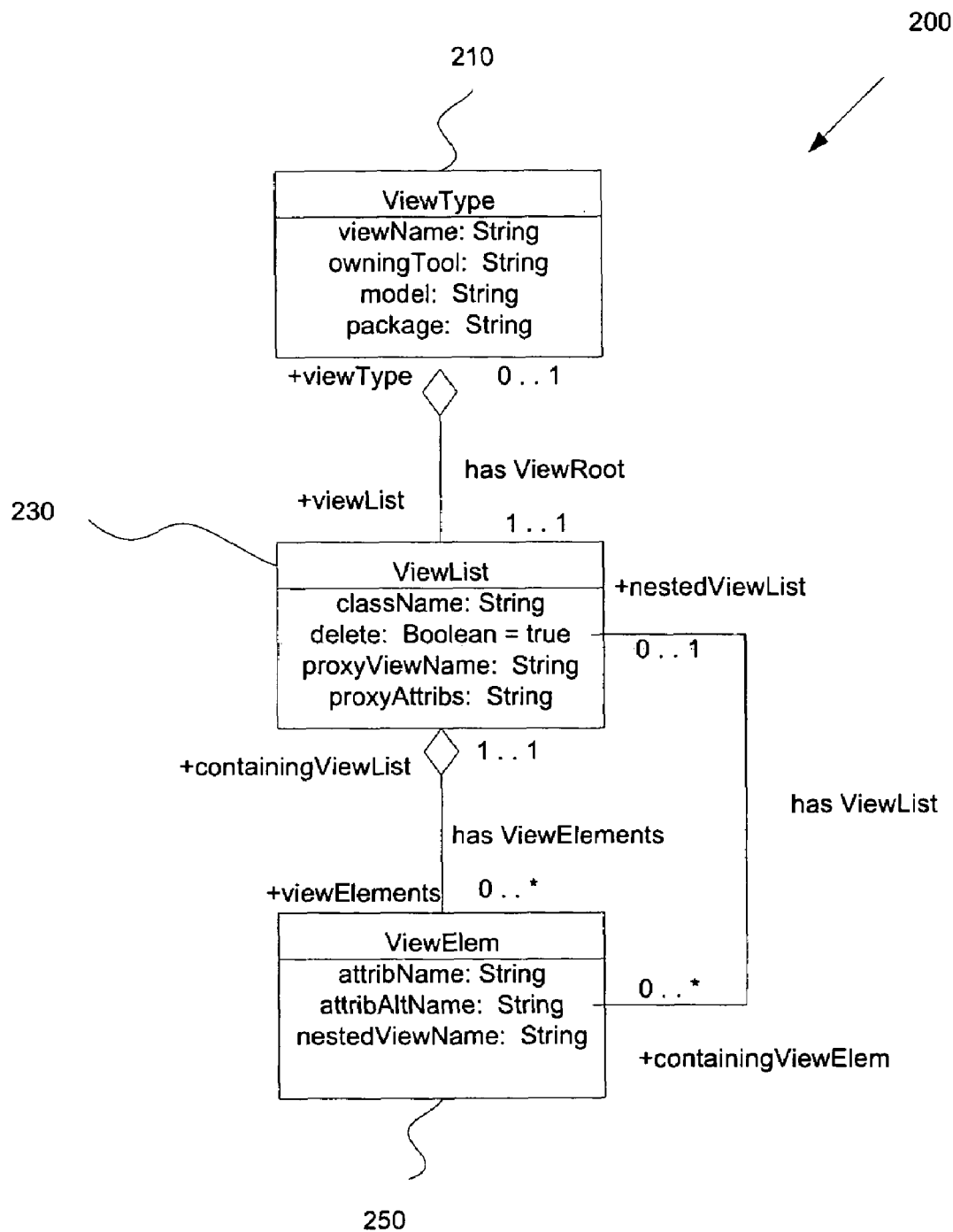
FIG. 2 illustrates a ViewType model in accordance with certain implementations of the invention.

FIG. 2 illustrates a ViewType model 200 in accordance with certain implementations of the invention. The ViewType model 200 includes a ViewType class 210, a ViewList class 230 and a ViewElem class 250, along with the attributes and associations of the classes. An instance of the ViewType class 210 (also referred to as a "ViewType object") describes the main attributes of a ViewType and includes, for example, a viewName attribute for the name of the ViewType, a model attribute for the name of the base model on which the ViewType is based, a package name attribute, and an optional reference attribute for the name of the tool that owns (i.e., "created") the ViewType. The root ViewType instance has one association to a root ViewList instance. A package may be described in the UML/EMOF notation used for scoping data in an XMI file. A package may have associated attributes (e.g., definitions of special tags used in the XMI file, definitions of transformation rules, etc.).

A ViewList instance is also referred to as a "ViewList object." The root ViewList instance and all other instances of the ViewList class contain information about classes found in the base model. The ViewList class 230 includes an attribute called className that names the base model class that the ViewList represents. The ViewList class 230 also has a delete flag, which is used to indicate to a delete function whether or not base model objects should be deleted within the scope of the ViewType. A ViewList class 230 also may include a proxyViewName and proxyAttribs attributes. Presence of a value in the proxyViewName attribute indicates that the base model class represented by the ViewList class is a placeholder, and the details of the base model class are described by another ViewType class' ViewList class. The set of attribute names listed in the ViewList's proxyAttribs attribute specify which of the proxied class' attributes are to be processed with a ViewType instance. The proxyViewName attribute and the association to a ViewElem in a ViewList instance are mutually exclusive; if a ViewList instance does not refer to a proxy, the ViewList instance may alternatively have an association to a ViewElem. A ViewList instance may also have no association or proxy.

The ViewList instance has an association to a ViewElem instance for each attribute and association in the base model class that needs to be defined in this ViewType for the unit of work for which the ViewType will be used.

Each instance of the ViewElem class 250 has an attribute called attribName whose value matches the name of the attribute or association the ViewElem class represents in the base model class. A ViewElem instance of a ViewElem class 250 may have a value in its attribAltName attribute to specify an alternate name for the represented attribute. The attribAltName might be used to ensure uniqueness of the attribute name within the set of ViewElem instances for a ViewType instance. If a ViewElem instance represents an atomic type of attribute, such as an integer type or a string type, then the ViewElem instance will not have a nested ViewList instance or ViewName instance. If, on the other hand, a ViewElem instance represents an attribute that is a complex type represented by a base model class or represents a base model association, then the ViewElem instance will either be connected to a nested ViewList instance through a hasViewList association or have a value in its nestedViewName attribute. A hasViewList association connects the ViewElem instance to a ViewList instance for the base model's associated class and that ViewList instance defines the associated base model class' attributes, associations, etc. For the hasViewList relationship, the ViewList instance has a containing ViewElem instance. A value in the nestedViewName attribute names a ViewType instance whose root ViewList instance represents the base model's associated class, and the rest of that ViewType is used to define the associated base model class' structure.

When defining the ViewType, a recursive type of model is used that works its way down to the leaf-most nodes that should be traversed. At the point in the ViewType definition where the leaf-most nodes are described, there is a ViewElem.

At the intermediate points in the ViewType definition where the tree continues to be defined, a ViewElem would be the source of a hasViewList relationship to another ViewList rooted on a ViewElem, and so this continues until the hasViewList relationship is not used (i.e., at the leaf-most node).

In certain implementations of the invention, a ViewElem instance representing an attribute or association may be used by one ViewList instance representing a class. To allow for reducing ViewType size, a ViewList instance may be nested by multiple ViewElem instances. Also a ViewType instance may be named as a nestedViewName by multiple ViewElem instances.

In certain implementations of the invention, a ViewType 146 is defined using an EMOF-based model (i.e., a type of base model 142). The ViewType 146 is described in an XMI format based on the ViewType Document Type Definition (DTD). A ViewType DTD may be described as a definition for a ViewType model, which contains the ViewType, ViewList, and ViewElem classes and associations.

Non-automated processes for creating ViewTypes 146 in the XMI format have proven to be very time consuming and error-prone. Implementations of the invention enable quickly and easily defining model-validated ViewTypes 146. For example, the ViewType generator 130 allows the user to create and maintain valid ViewType XMI based on a user-specified EMOF-based model. The ViewType XMI describes a subset of base model classes, along with attributes and associations, as ViewType objects. ViewType objects are defined by the ViewType.

In order to define and process a subset of a base model required for a logical unit of work, implementations of the invention enable defining of ViewTypes 146. A ViewType 146 may be described as a user-defined scope or grouping of interrelated objects that can be used to access and manipulate instance data for a base model 142. A ViewType 146 references classes from the base model 142, starting from a root class, and identifies any attributes and/or associations to the base model classes. The ViewType 146 branches out in a tree type of structure, describing each of the associated classes needed by a logical unit of work. ViewTypes 146 are used to programmatically manipulate instances of the base model 142 at a less granular level than the class or object.

Figure 3:
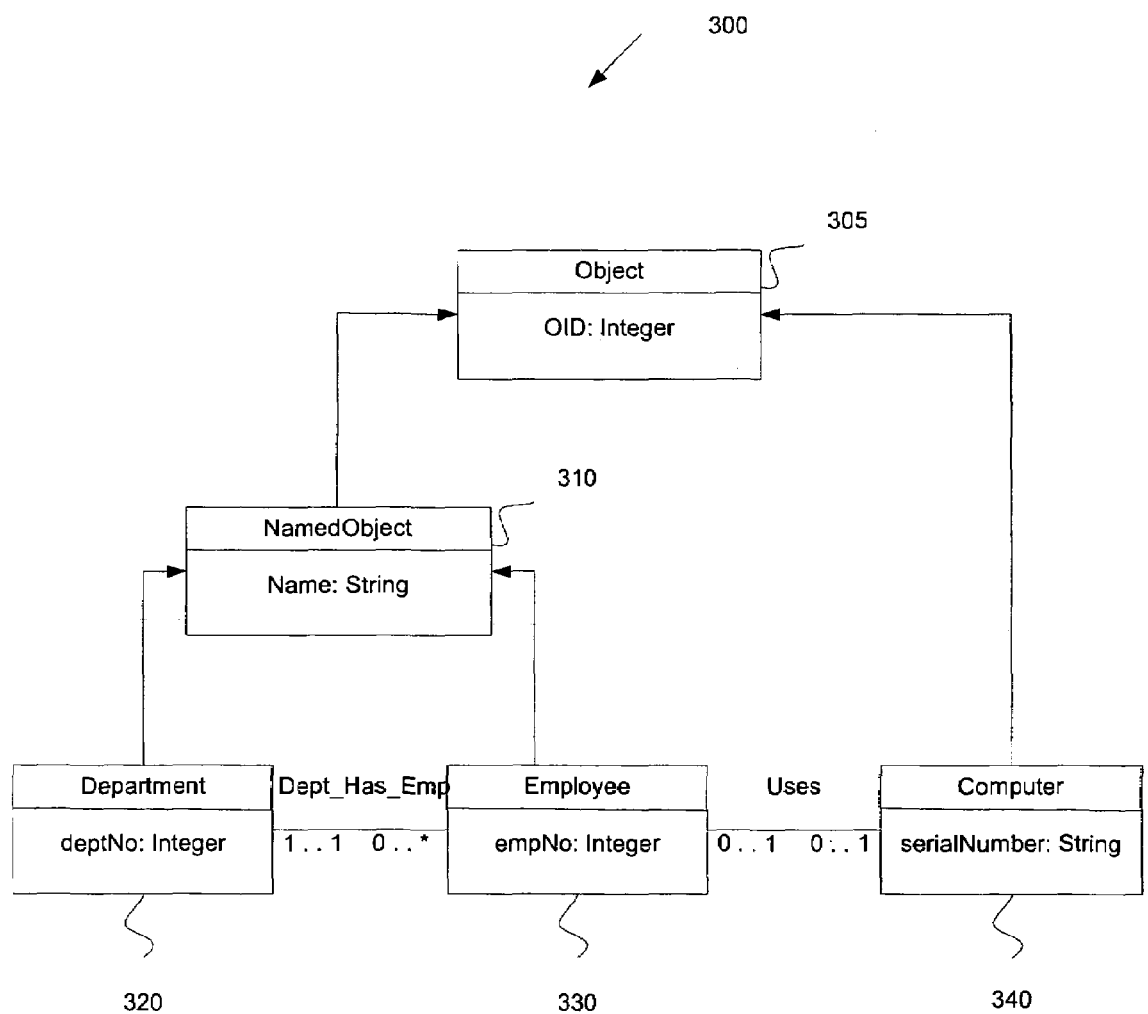
FIG. 3 illustrates an example of a Department-Employee base model that is an EMOF-based model in accordance with certain implementations of the invention.

The purpose of a base model 142 is to represent a set of objects and their relationships. For example, the base model 142 may be an EMOF-based model. FIG. 3 illustrates an example of a Department-Employee base model 300 that is an EMOF-based model in accordance with certain implementations of the invention. For example, the Department-Employee base model 300 describes a set of classes, attributes of the classes, and the associations from each class to other classes. In certain implementations of the invention, a graphical tool may be used to define the classes (e.g., Rational Rose Realtime available from International Business Machines, Corporation). Also, tools may be used to export the model as an XML Metadata Interchange (XMI) document describing the EMOF-based model. That is, certain tools (e.g., Rational Rose Realtime) output a model output file that can be transformed into XMI format, which is provided as input to certain implementations of the invention. The Department-Employee base model 300 includes a NamedObject class 310, which includes a "name" of string type. A Department class 320 includes a department number (labeled "deptNo") of integer type and inherits the characteristics of the NamedObject class 310. An Employee class 330 includes an employee number (labeled "empNo") of integer type and inherits the characteristics of the NamedObject class 310. A Computer class 340 includes a serial number (labeled "serialNumber") of string type. Also, all classes 310, 320, 330, 340 inherit the characteristics (i.e., the OID) of an object class 305 that is the top level class in a base model 142. In addition, an Employee is in one Department, a Department has 0-m (where m may be any integer value) Employees, and an Employee may have a Computer or may not have a Computer (i.e., a 0..1 relationship).

Both the Department class 320 and the Employee class 330 inherit from the NamedObject class 310. Because the Department class 320 inherits from the NamedObject class 310, the Department class 320 logically has two attributes: deptNo and name. Likewise, each instance of the Employee class may be thought to have two attributes: empNo and name. In addition, instances of the Department class 310 can be related to instances of the Employee class 330 via the Dept_Has_Emps association. Instances of the Employee class 330 may be related to instances of the Computer class 340 via the Uses association.

Figure 4:
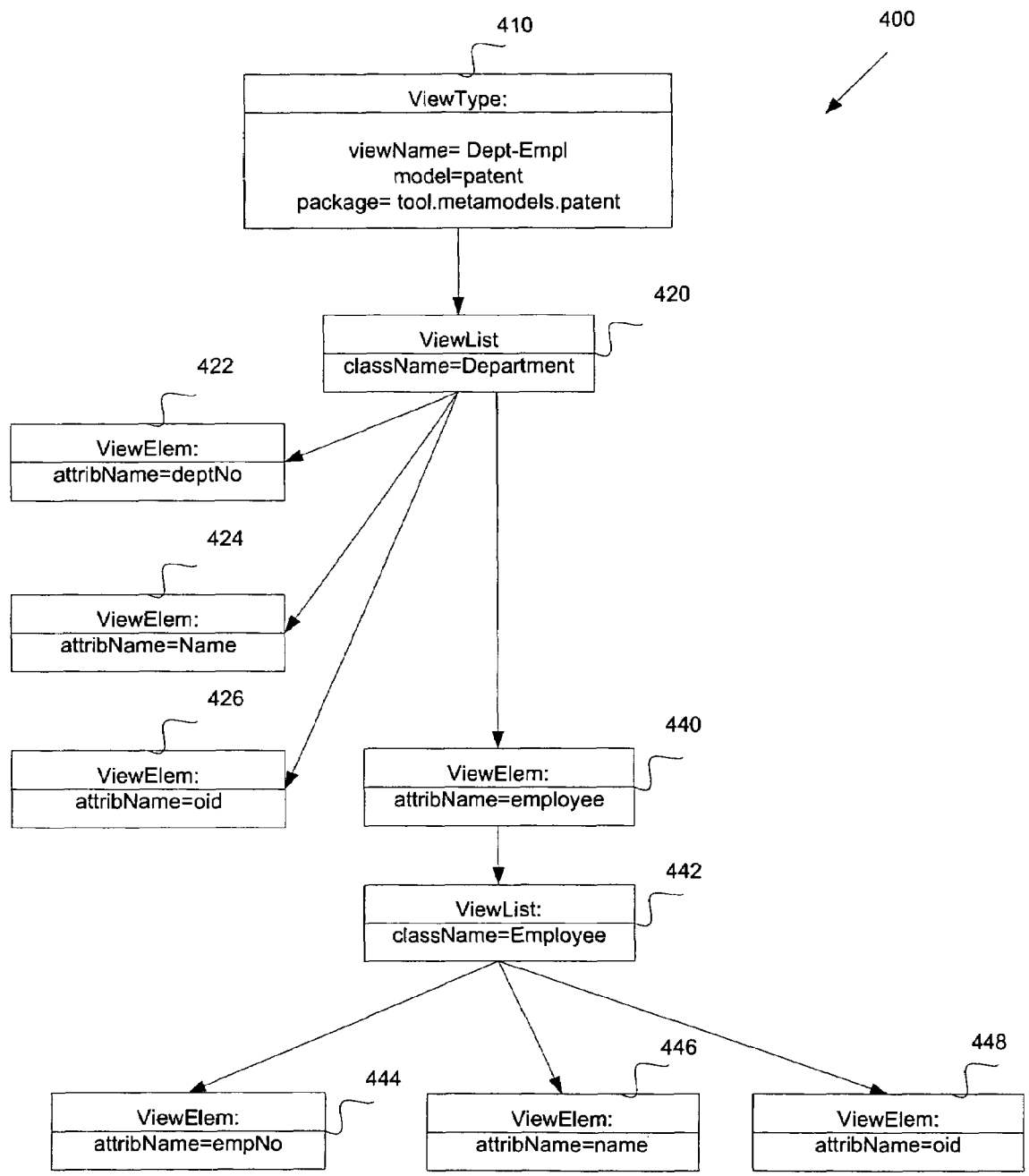
FIG. 4 illustrates an example of a ViewType based on a Department-Employee model in accordance with certain implementations of the invention.
Figure 5:
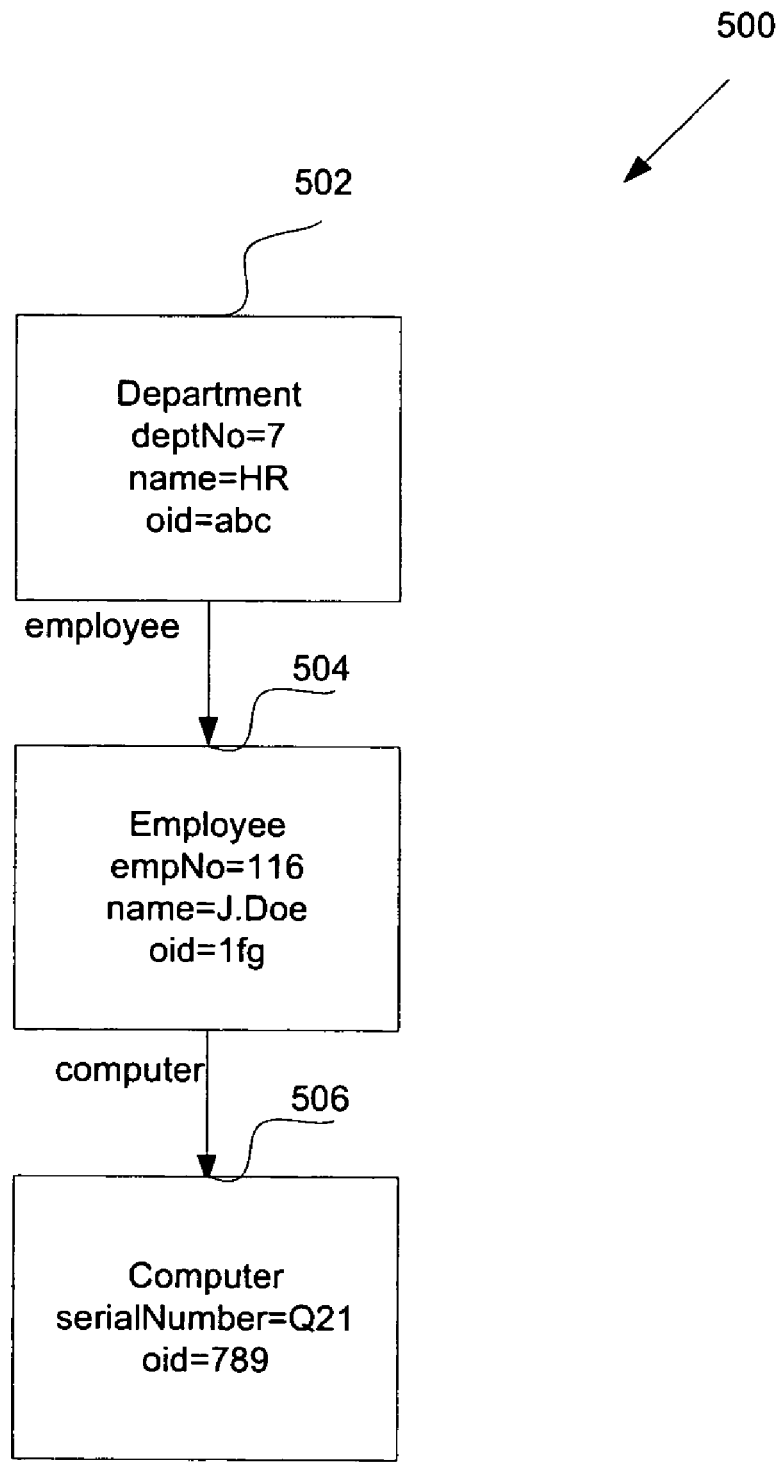
FIG. 5 illustrates instance data for a Department-Employee model in accordance with certain implementations of the invention.

FIG. 4 illustrates an example of a ViewType based on a Department-Employee model in accordance with certain implementations of the invention. FIG. 5 illustrates instance data for a Department-Employee model in accordance with certain implementations of the invention. The example of FIGS. 4 and 5 will be used to illustrate how the ViewWalker system 150 traverses instance data 500 for a base model using the ViewType 400. In this example, the ViewWalker system 150 initially determines that the ViewType's 410 root ViewList's 420 className attribute specifies the class, or a superclass, type of the instance data's root object, "Department". In this case, the root ViewList's 420 className is "Department", and the root object 502 is a Department so data traversal and operation application commences.

In the root-to-leaf order, an operation, such as read or update, is first applied to the root "Department" object 502. Then the ViewList for the "Department" class 420 is processed. Each of the ViewList's ViewElems 422, 424, 426, and 440, are processed to determine if their corresponding attributes or associations are present in the "Department" object 502. The ViewWalker system 150 applies the operation to the "Department" object 502 attributes that are not associated with another class (deptNo, name, oid) where applicable. The ViewWalker system 150 then processes attributes that are associated with another class (i.e., by processing ViewElems that have a nestedViewList or a nestedViewName and their associated instance object), and traversal continues. In this example, the ViewList for the "Department" class 420 has one ViewElem, "employee" 440, that represents an association by way of its nestedViewList. This ViewElem for "employee" 440 represents the association between the "Department" object 502 and its target "Employee" object 504. Since there is instance data for this association between the "Department" and "Employee" objects, the ViewWalker proceeds to process the "Employee" object 504.

In the root-to-leaf order, the operation is applied to the "Employee" object 504. Then the ViewList for the "Employee" class 442 is processed. Each of the ViewList's ViewElems 444, 446, 448, are processed to determine if their corresponding attributes or associations are present in the "Employee" object 504 The ViewWalker applies the operation to the "Employee" object 504 attributes that are not associated with another class (empNo, name, and oid) where applicable. The ViewWalker system 150 then processes attributes that are associated with another class and ViewType traversal continues. In this example, the ViewList for the "Employee" class 442 has no ViewElems that represent any association and traversal stops. The association between the "Employee" object 504 and the "Computer" object 506 is not described in the ViewType 400, therefore it is not traversed and the operation is not applied to the "Computer" object 506.

If a leaf-to-root order operation (e.g., delete) is specified for the walk, then the operation is applied to the "Employee" object 504 Processing is now done with the ViewList for the "Employee" class 442. Processing returns the ViewList for the "Department" class 420. If a leaf-to-root order is specified for the walk, the operation is applied to the "Department" object 502. Processing is now done with the ViewList for the "Department" class 420. Since the ViewList for the "Department" class 420 is the root ViewList, the ViewWalker system 150 processing returns to the ViewType "Dept—Empl" and is complete.

To further illustrate implementations of the invention, examples of an update operation and a delete operation are discussed with reference to FIGS. 4 and 5.

For example, an update operation is applied in the root-to-leaf order. In this example, the ViewWalker system 150 initially checks that the ViewType's 410 root ViewList's 420 className attribute specifies the class type of the instance data's root object 502, which it does: "Department". In the root-to-leaf order, the update operation is applied to the "Department" object 502 and the object's 502 attributes first. Then the "Department" object 502 "deptNo", "name", and "oid" attributes are checked. Since these attributes map to ViewElem 422, 424, and 426 in the ViewType 410, but none of the ViewElem has a nested ViewList, the attributes are not used for traversal.

Next, the "Department" object 502 "employee" association is checked. The name of the "employee" association matches the "Department" ViewList's ViewElem 440 for "employee" and the association's target object, an "Employee" object 504 with empNo=116 and className="Employee", matches the "employee" ViewElem's nestedViewList 442 for the "Employee" class. Therefore, the "Employee" object 504 is traversed next. Since the update operation is being applied in the root-to-leaf order, the update operation for the "Employee" object 504 is performed.

Next, the "Employee" object 504 attributes for "empNo", "name", and "oid" are checked, but they are not traversed because the ViewElems 444, 446, and 448 to which they map do not have nested ViewLists.

Additionally, the "Employee" object 504 "computer" association is examined. Since the ViewList 442 for the "Employee" class does not include a ViewElem for "computer", the association is not traversed, the "Computer" object 506 in the instance data 500 is effectively ignored, and the update operation is not applied to the "Computer" object 506. Because the "Employee" object 504 has no additional associations, the ViewWalker system 150 ends its traversal of this branch and recursively returns back to the processing of the "Department" object 502. The "Department" object 502 has no additional associations, so its processing returns too, and the root-to-leaf traversal for the update operation and processing of the Dept-Empl ViewType is finished.

A delete operation is applied in the leaf-to-root order. Again, the ViewWalker system 150 checks that the ViewType's 410 root ViewList's 420 className attribute specifies the class type of the instance data's root object 502, which it does: "Department". In the leaf-to-root order, the delete operation is not yet performed on the "Department" object 502. The "Department" object 502 "deptNo", "name", and "oid" attributes are checked. Since none of these attributes is an connects to another object (i.e., the ViewElem 422, 424, and 426 to which the attributes map do not have nested ViewLists), the attributes are ignored.

Then the "Department" object 502 "employee" association is checked. The name of the "employee" association matches the "Department" ViewList's 420 ViewElem 440 for "employee" and the association's target object, an "Employee" object 504 with empNo=116 and className="Employee", matches the "employee" ViewElem's nestedViewList for the "Employee" class. Therefore, the "Employee" object 504 is traversed next. The "Employee" object attributes for "empNo", "name", and "oid" are checked for object-attribute definition, but they are ignored because the ViewElem 444, 446, and 448 to which they map do not have nested ViewLists.

Then the "Employee" object 504 "computer" association is examined. Since the ViewList 442 for the "Employee" class does not include a ViewElem for "computer", the association is not traversed, and the "Computer" object 506 in the instance data 500 is ignored. Because the "Employee" object 504 has no additional associations, and because a leaf-to-root order for "delete" was specified for the walk, the delete operation is now performed on the "Employee" object 504 The ViewWalker system 150 ends its traversal of this branch and recursively returns back to the processing of the "Department" object 502. The "Department" object 502 has no additional associations, so the "delete" operation is now performed on the "Department" object 502. The leaf-to-root "delete" processing of the Dept—Empl ViewType is finished with the traversal.

Figure 6:
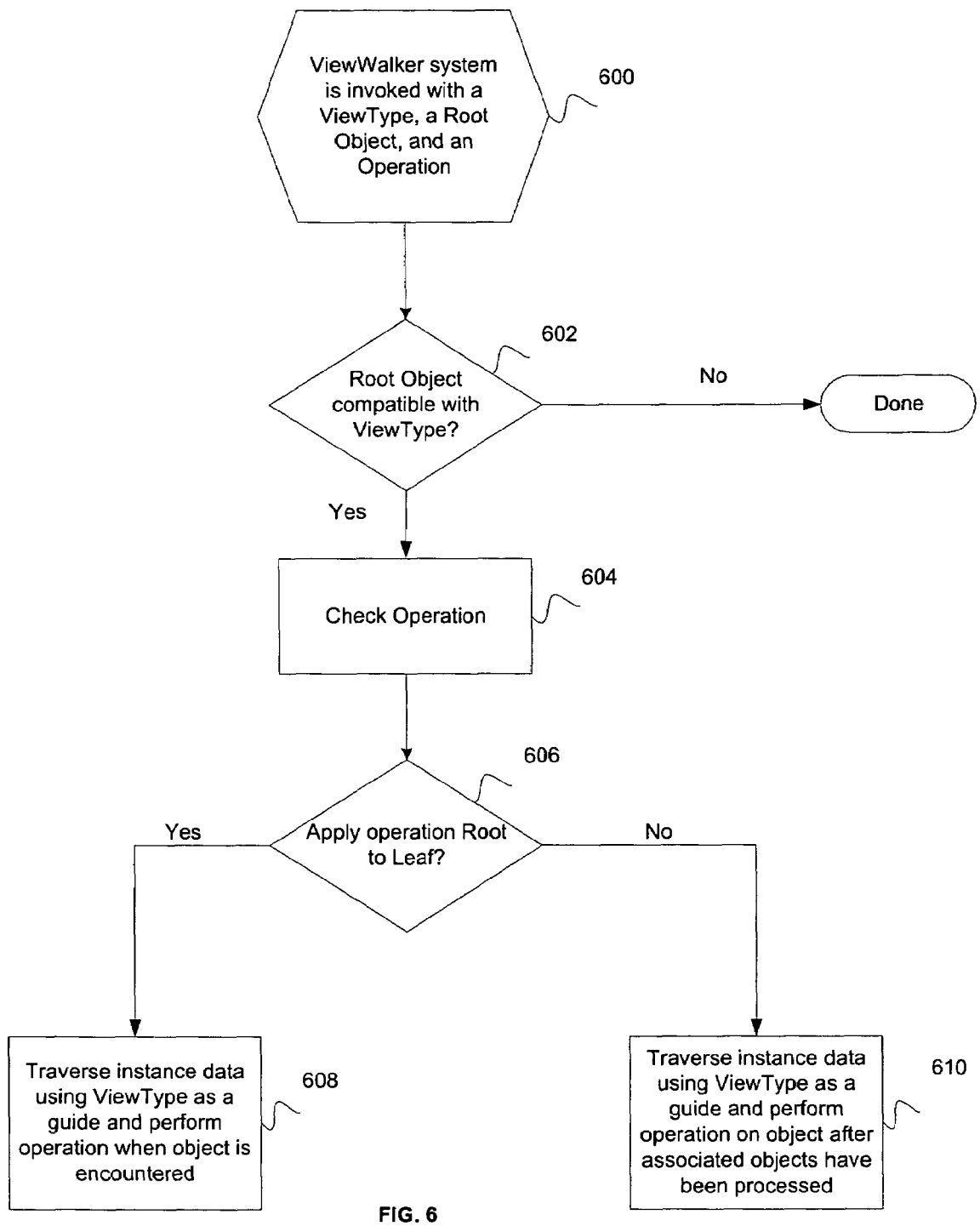
FIG. 6 illustrates logic implemented in a ViewWalker system to perform an operation on one or more objects of a base model in accordance with certain implementations of the invention.

FIG. 6 illustrates logic implemented in the ViewWalker system 150 to perform an operation on one or more objects of a base model 142 in accordance with certain implementation of the invention. When the ViewWalker system 150 is invoked for an operation, such as create or update that puts data in a relational database, the base model instance data is already loaded in memory from some source (e.g., an XMI file). The ViewWalker system 150 traverses the in-memory data mapped by the ViewType and performs an operation such as create or update to store information in the relational database. Conversely, an operation such as read may be applied by the ViewWalker 150 to get data from the relational database. In this case, the ViewWalker system 150 gets data from the relational database into memory as it traverses a ViewType. In either case, the instance data for the base model 142 is represented by a set of objects in memory.

Control begins at block 600 with invocation of the ViewWalker system 150. When the ViewWalker system 150 is invoked (e.g., by a client application 110 ), a ViewType 146, a root object, and an operation are specified. The ViewType 146 is specified for traversal guidance. That is, the instance data for the base model 142 is traversed or "walked" using the structure of the ViewType 146 as a guide to identify which objects of the base model 142 should be processed. The root object identifies an object in the base model 142 and the corresponding object in the ViewType 146 serves as the starting point for the traversal of the ViewType 146. The operation specified is to be performed on the instance data for the base model 142.

In block 602, the ViewWalker system 150 determines whether the root object is compatible with the ViewType 146 to be traversed. If so, processing continues to block 604, otherwise, processing is done. That is, the ViewWalker system 150 verifies that the specified root object of the base model 142 is compatible with an object that is specified in the ViewType 146 (i.e., an object type specified by the ViewType's root ViewList may be a superclass of the base model object instance).

In block 604, the specified operation is checked. In particular, the operation specified to the View Walker is validated to ensure that a method or function exists with the given name and that it is possible to invoke that method or function against the object specified. The operation may be one of a set of operations that the ViewWalker system 150 recognizes or may be the name of a method in one or more of the objects to be traversed. Some examples of operations to be performed on data in the objects of the base model 142 include, for example, reading data, updating data, deleting data, and adding data.

The objects of the base model are organized in a network. A ViewType defined for a base model provides a root, or starting point, from which zero or more objects emanate. An object from which no other objects emanate is referred to as a "leaf" object. A root can actually be a leaf if no objects emanate from the root.

An operation may be applied to each object in the base model 142 (i.e., each piece of instance data) when the object in the base model 142 is initially encountered (producing a root-to-leaf order of application) or after the object's associated objects in the base model 142 have been processed (producing a leaf-to-root order of application). In certain implementations of the invention, the order of application of the operation (i.e., root-to-leaf or leaf-to-root) is determined based on the type of the operation. For operations performed in the root-to-leaf order, the operation is performed on the root first, then the operation is cascaded out to the leaves. Some operations, however, are performed in the leaf-to-root order so that the operation is performed on the leaves first, and then the operation is performed on other objects, working back to the root. A cascading type of delete function is an example of an operation for which leaf-to-root order may be used. In this case, the delete starts at the leaves of the instance data. If the root instance is deleted before the leaves, then parts of the instance data are deleted before they are traversed. Also, traversal of deleted data may cause unexpected results. An add operation is one that may be performed in the root-to-leaf order.

In block 606, if the order of application of the operation has been determined to be root-to-leaf based on checking the operation, processing continues to block 608, otherwise, processing continues to block 610. Regardless of the order of application of the operation, the ViewWalker system 150 starts traversal at the root object using the root ViewType's ViewList to determine which associations to traverse first.

In block 608, the instance data is traversed using the ViewType 146 as a guide and the operation is performed on an object when the object is encountered. When the operation is performed, the operation is actually performed on data in the object. In the root-to-leaf order of application, the operation is applied to the root object. Then each of the root object's attributes and associations is examined. An association relates two objects, which may be referred to as a "source" object and a "target" object. For example, the root object may be a source object related to one or more target objects. A ViewElem may be described as an attribute with a data type. When that data type is a class (as opposed to a simple String, Integer, Enum, etc.), the ViewElem represents another object that is the target of a n–1 association. The processing of the ViewWalker system 150 processes the related objects of the source object when processing the associations of the source object.

If the attribute or association of a source object is specified in the ViewType 146 as one of the source object's ViewList's ViewElems, then the attribute or association is considered for traversal, otherwise, the attribute or association is skipped. Associations and their target objects are considered for traversal. Attributes are considered for traversal if they are "object attributes". An object attribute represents a complex type of attribute that is defined by an object. Unlike a complex type of attribute, an atomic attribute is defined by an enumerated type (e.g., integer, string, etc.). When an association or object attribute is considered for traversal, a related target object is examined. If the target object class, or one of its superclasses, matches the corresponding ViewElem's nestedViewList's className, then the target object is compatible and qualifies for traversal. The operation is applied to the target object and the target object is processed in the same manner as the source object (e.g., the attributes and associations of the target object are processed), using the nestedViewList for its traversal qualification. Traversal qualification may be described as the definitions in the ViewType for which associations are traversed. When the target object is processed in this manner, the object may be referred to as a "source" object as the object may be related to other objects (i.e., target objects) by associations. The attributes and associations of the object whose names match those in the ViewType's 146 corresponding ViewElem are examined. If an attribute's defining object class name, or an association's target object class name or one of its superclass names matches the className of the nestedViewList, then the operation is applied to the related object and processing continues until the instance data has been completely traversed relative to the ViewType 146.

In block 610, the instance data is traversed using the ViewType 146 as a guide and the operation is performed on an object after associated objects have been processed. In the leaf-to-root order of application, the operation is not applied to any object until after the object's associated object attributes and associations are traversed and consequently operated on. Because the traversal is recursive, the operation is performed on each object as the traversal returns from walking back to the root from the leaf or leaves. This results in the operation being first applied to the last object traversed. Some operations (e.g., a cascading delete) use this order of application, while other operations use the root-to-leaf order of application.

In either case, traversal of a branch of the tree structure representing the base model 142 finishes when either an object with no attributes or associations matching those mentioned in the ViewType 146 at the appropriate ViewList is encountered or when the ViewList for a processed object has no ViewElem with nested ViewLists. In other words, when the instance data runs out of related objects or when the ViewType's 146 branch reaches a leaf, the ViewWalking system 150 of a subset of instance data completes and returns back up the path of traversal. The traversal is complete when all related instance data mapped by the ViewType 146 definition has been visited and traversed.

Following Pseudocode A lists pseudocode for processing performed by the ViewWalker system 150 in accordance with certain implementations of the invention, and slashes (//) precede comments.

```
                              Pseudocode A

Main:
    Initialize the ViewWalker system for a specific ViewType
            Call walkData (aRootObject, someOperation) to walk instance data rooted
on aRootObject, applying someOperation
end Main
walkData (aRootObject, someOperation):
    initialize set of processed objects
        initialize order of operation (default=root-to-leaf)
            rootClass = ViewType's ViewList's className
            if aRootObject is a rootClass or subclass of rootClass
                    walkAndApply (aRootObject, someOperation, aRootViewList)
        else
            can't walk aRootObject using this ViewType
end walkData (aRootObject, someOperation)
walkAndApply (anInstanceObject, someOperation, aViewList) - (recursive):
    // this function is invoked by the walkAndApply (aRootObject, someOperation,
    aRootViewList) function
    if already seen anInstanceObject
        return (don't traverse or apply operation to anInstanceObject > 1 time)
    if order of operation == root-to-leaf
        apply (anInstanceObject, someOperation)
    // traverse a subset of this object's attributes and associations
    for each of aViewList's ViewElem
        walkAndApply (anInstanceObject, someOperation, aViewElem)
    if order of operation == leaf-to-root
        apply (anInstanceObject, someOperation)
end walkAndApply (anInstanceObject, someOperation, aViewList) - (recursive)
walkAndApply (anInstanceObject, someOperation, aViewElem) - (recursive):
        if order of operation is root-to-leaf
            apply (anInstanceObject, someOperation, namedAttribute)
        nestedViewList = aViewElem's nestedViewList
        if aViewElem has a nestedViewName
            nestedViewList = nested ViewType's ViewList
        if no nestedViewList
            return
        for each of the objects related to aninstanceObject through an
        association or an object attribute AND named aVieElem's attribName
            if the relatedObject's class name == the nestedViewList's className OR
            if one of the relatedObject's superclass' names == nestedViewList's
                className
                walkAndApply(relatedObject, someOperation, nestedViewList)
        (end for)
        if order of operation is leaf-to-root
            apply (anInstanceObject, someOperation, namedAttribute)
end walkAndApply (anInstanceObject, someOperation, aViewElem)
```

The portion of Pseudocode A for applying an operation to an object with the ViewWalker system 150 is as follows:

```
                          Portion of Peudocode A apply (anInstanceObject, someOperation)
        if someOperation is known by ViewWalker
            process anInstanceObject accordingly
        else
            perform someOperation on anInstanceObject
    end apply (anInstanceObject, someOperation)
    apply (anInstanceObject, anOperation, namedAttribute)
        if anOperation for namedAttribute is known by the ViewWalker
            process anInstanceObject's namedAttribute accordingly
        else
            perform anOperation for anInstanceObject's namedAttribute
    end apply (anInstanceObject, anOperation, namedAttribute)
```

The above portion of Pseudocode A for applying an operation to an object with the ViewWalker system 150 shows the possibility that the operation may be performed in one of two ways. If the implementation of the ViewWalker system 150 understands the operation itself and implements its own function/method for performing the operation, then the ViewWalker system 150 function/method for the operation is invoked. On the other hand, if the ViewWalker system 150 does not explicitly understand the operation, then the instance data's own method can be invoked to perform the operation.

In certain implementations of the invention, ViewType generator 130 function for creating a comprehensive View-Type for a data model may be invoked as the ViewWalker system 150 is initialized. This allows for more dynamic view handling of instance data. A comprehensive ViewType does not include redundant declarations of classes that might be required in more than one branch of the ViewType. Instead, the comprehensive ViewType uses existing declarations to form a networked ViewType. The comprehensive ViewType makes use of recursive structures to allow the comprehensive ViewType to be used with any configuration of instance data that adheres to the base model. Because most base models are actually networks as opposed to hierarchies, ViewTypes also can be networks in support of base models.

An example for the use of this idea is an "add" operation. A chunk of instance data is submitted to the ViewWalker system 150 with a root object indicated, dynamic view generation flagged, and the name of the base model 142 that describes the data and its relationships. Instead of looking for an existing ViewType 146, the ViewWalker system 150 creates a comprehensive view, using the ViewType generator 130, based on the root object and the indicated base model 142. Then, using this dynamically created ViewType 146, the ViewWalker system 150 processes the instance data, applies an operation, such as adding data to the database, as the instance data is traversed. This allows the instance data passed to the ViewWalker system 150 to be processed, regardless of what is defined by a statically defined ViewType 146 that might be incomplete or might have become obsolete.

In certain implementations of the invention, Pseudocode A for the ViewWalker system 150 may be modified so that the main function of Pseudocode A is replaced by Pseudocode B

```
Main:
    if ViewType not specified
        Invoke View Type Builder to create a comprehensive
        ViewType based on
the object type of aRootObject and the model
        Initialize the ViewWalker for the ViewType
        Use the ViewWalker to walk instance data rooted on
        aRootObject, applying
someOperation
end
```

Because all the ViewType objects are complete, having all the attribute and association representations from the model class, they can be reused. The advantages of comprehensive ViewTypes are twofold. First, they can be much smaller than a fully expanded ViewType with the same information. Second, comprehensive ViewTypes are complete. If the user does not know exactly what subset of the model a unit of work will deal with, then a comprehensive ViewType, may be used to process any configuration of instance data that adheres to the same model on which the ViewType is based. The ViewType generator 130 processes ViewTypes in such a way as to avoid infinite looping, although recursion is used.

Thus, implementations of the invention provide a new type, referred to as a "ViewType" that simplifies the process of manipulating data by specifying those parts of the EMOF-based model needed for a logical unit of work. Implementations of the invention also enable using ViewTypes to traverse instance data described by an EMOF-based model and applying an operation as the data is traversed (i.e., "walked").

Additional Implementation Details

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium.

The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

The logic of FIG. 6 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIG. 6 may be implemented in software, hardware, programmable and non-programmable gate array logic or in some combination of hardware, software, or gate array logic.

Figure 7:
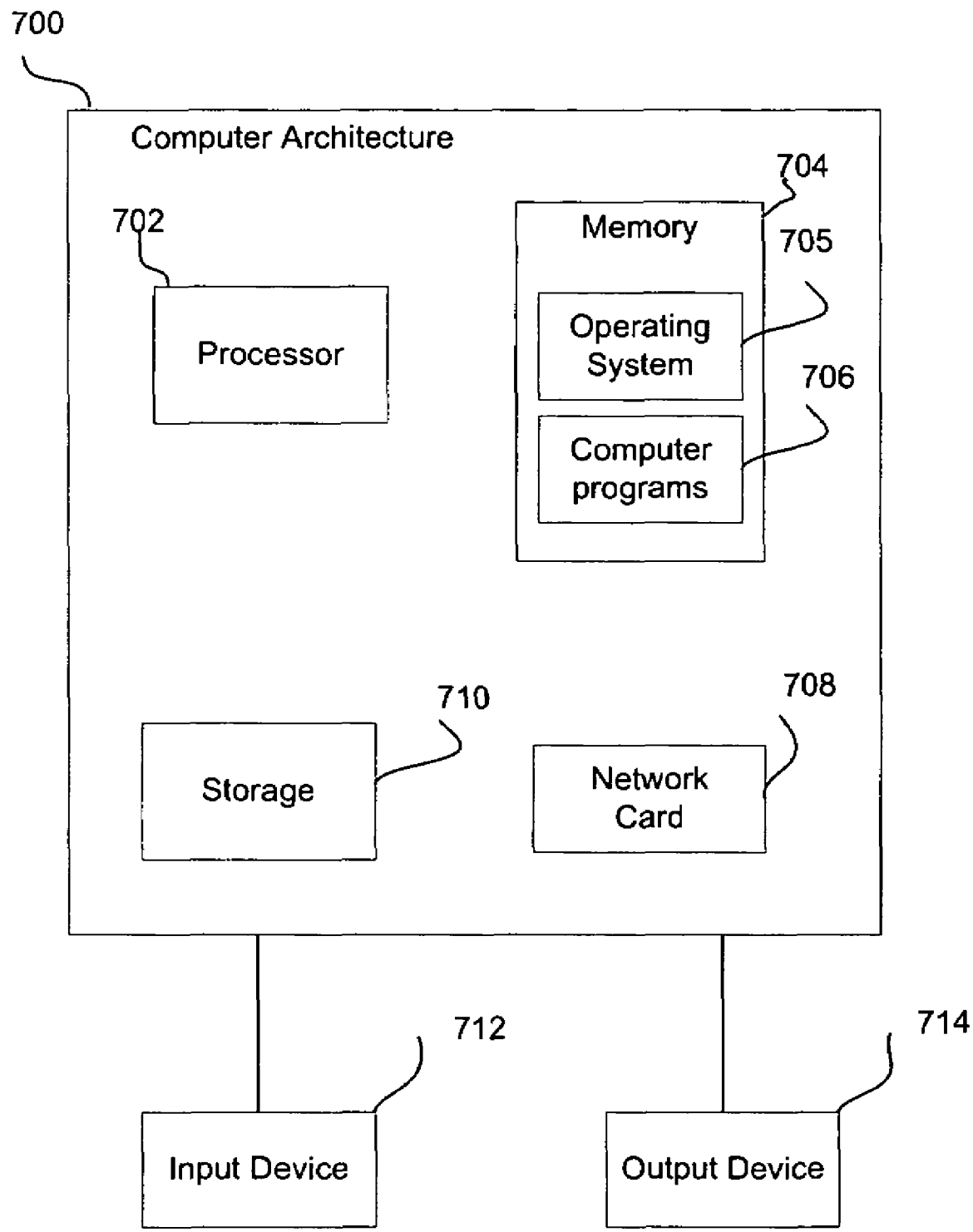
FIG. 7 illustrates an architecture of a computer system that may be used in accordance with certain implementations of the invention.

FIG. 7 illustrates an architecture of a computer system that may be used in accordance with certain implementations of the invention. Client computer 100, server computer 120, and/or operation console 180 may implement computer architecture 700. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information transmitted from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of implementations of the invention has been presented for the purposes of illustration and description. It is not intended to be exhaustive or to limit the implementations of the invention to the precise form disclosed. Many modifications and variations are possible in

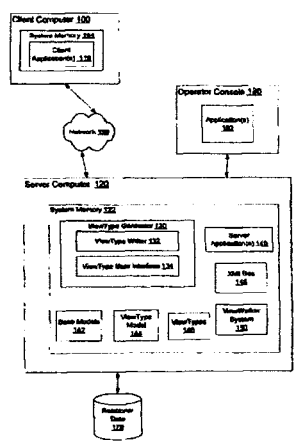

What is claimed is:

1. A method for manipulating instance data described by a base model, comprising:

receiving a ViewType, a root object representing an object of the base model, and an operation, wherein the ViewType references at least some classes, attributes, and associations of the base model as ViewType objects, an object in the ViewType corresponding to the object of the base model serves as a starting point for traversal of the ViewType, and wherein the operation is applied to one or more objects of the instance data;

determining whether the ViewType and the root object are compatible based on an object type specified by a ViewList of a root of the ViewType, wherein the ViewList contains information about the classes in the base model; and in response to determining that the ViewType and the root object are compatible, applying the operation to the one or more objects of the instance data of the base model by visiting each object of the instance data in a traversal path designated by a structure of the ViewType, wherein the structure of the ViewType is used as to identify which of the one or more objects of the instance data are to be processed.

2. The method of claim 1, wherein the operation is applied in a root-to-leaf order and wherein the operation is performed on an object when the object is encountered.

3. The method of claim 1, wherein the operation is applied in a leaf-to-root order and wherein the operation is performed on an object after associated objects have been processed.

4. The method of claim 1, wherein the instance data comprises the one or more objects in memory.

5. The method of claim 4, further comprising:

traversing an attribute of an object where the attribute maps to a ViewElem in a ViewList representing the object in the ViewType; and traversing an association of the object where the association maps to a ViewElem in a ViewList representing the object in the ViewType and wherein the association mapped by the ViewElem has a target object with a type that is compatible with the object type represented by the nested ViewList of the ViewElem.

6. An article of manufacture comprising a computer readable storage medium including a program for manipulating instance data described by a base model, wherein the program is capable of causing operations to be performed, the operations comprising:

receiving a ViewType, a root object representing an object of the base model, and an operation, wherein the ViewType references at least some classes, attributes, and associations of the base model as ViewType objects, an object in the ViewType corresponding to the object of the base model serves as a starting point for traversal of the ViewType, and wherein the operation is applied to one or more objects of the instance data;

determining whether the ViewType and the root object are compatible based on an object type specified by a ViewList of a root of the ViewType, wherein the ViewList contains information about the classes in the base model; and in response to determining that the ViewType and the root object are compatible, applying the operation to the one or more objects of the instance data of the base model by visiting each object of the instance data in a traversal path designated by a structure of the ViewType, wherein the structure of the ViewType is used as to identify which of the one or more objects of the instance data are to be processed.

7. The article of manufacture of claim 6, wherein the operation is applied in a root-to-leaf order and wherein the operation is performed on an object when the object is encountered.

8. The article of manufacture of claim 6, wherein the operation is applied in a leaf-to-root order and wherein the operation is performed on an object after associated objects have been processed.

9. The article of manufacture of claim 6, wherein the instance data comprises the one or more objects in memory.

10. The article of manufacture of claim 9, wherein the program is capable of causing operations further comprising:

traversing an attribute of an object where the attribute maps to a ViewElem in a ViewList representing the object in the ViewType; and traversing an association of the object where the association maps to a ViewElem in a ViewList representing the object in the ViewType and wherein the association mapped by the ViewElem has a target object with a type that is compatible with the object type represented by the nested ViewList of the ViewElem.

11. A system for manipulating instance data described by a base model, comprising:

circuitry comprising hardware logic capable of performing operations, the operations comprising:

receiving a ViewType, a root object representing an object of the base model, and an operation, wherein the ViewType references at least some classes, attributes, and associations of the base model as ViewType objects, an object in the ViewType corresponding to the object of the base model serves as a starting point for traversal of the ViewType, and wherein the operation is applied to one or more objects of the instance data;

determining whether the ViewType and the root object are compatible based on an object type specified by a ViewList of a root of the ViewType, wherein the ViewList contains information about the classes in the base model; and in response to determining that the ViewType and the root object are compatible, applying the operation to the one or more objects of the instance data of the base model by visiting each object of the instance data in a traversal path designated by a structure of the ViewType, wherein the structure of the ViewType is used as to identify which of the one or more objects of the instance data are to be processed.

12. The system of claim 11, wherein the operation is applied in a root-to-leaf order and wherein the operation is performed on an object when the object is encountered.

13. The system of claim 11, wherein the operation is applied in a leaf-to-root order and wherein the operation is performed on an object after associated objects have been processed.

14. The system of claim 11, wherein the instance data comprises the one or more objects in memory.

15. The system of claim 14, wherein the circuitry is capable of causing operations further comprising:
- traversing an attribute of an object where the attribute maps to a ViewElem in a ViewList representing the object in the ViewType; and
- traversing an association of the object where the association maps to a ViewElem in a ViewList representing the object in the ViewType and wherein the association mapped by the ViewElem has a target object with a type that is compatible with the object type represented by the nested ViewList of the ViewElem.

\* \* \* \* \*

UNITED STATES PATENT AND TRADEMARK OFFICE
CERTIFICATE OF CORRECTION

| | | |
|---|---|---|
| PATENT NO. | : 7,409,408 B2 | Page 1 of 1 |
| APPLICATION NO. | : 11/021898 | |
| DATED | : August 5, 2008 | |
| INVENTOR(S) | : Sharon T. Conn, Amy Marie Silberbauer and Philip L. Boyer | |

It is certified that error appears in the above-identified patent and that said Letters Patent is hereby corrected as shown below:

Beginning in Column 15, Row 55 and ending in Column 18, Row 6, delete Claims 6 through 15.

Signed and Sealed this
Tenth Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,409,408 B2
APPLICATION NO. : 11/021898
DATED : August 5, 2008
INVENTOR(S) : Sharon T. Conn, Amy Marie Silberbauer and Philip L. Boyer It is certified that error appears in the above-identified patent and that said Letters Patent is hereby corrected as shown below:

Delete the title page and substitute therefore the attached title page showing the corrected number of claims in patent.

Beginning in Column 15, Row 55 and ending in Column 18, Row 6, delete Claims 6 through 15.

This certificate supersedes the Certificate of Correction issued May 10, 2011.

Signed and Sealed this
Thirty-first Day of May, 2011

David J. Kappos
*Director of the United States Patent and Trademark Office*

(12) United States Patent
Conn et al.

(10) Patent No.: US 7,409,408 B2
(45) Date of Patent: Aug. 5, 2008

(54) USING VIEWTYPES FOR ACCESSING INSTANCE DATA STRUCTURED BY A BASE MODEL

(75) Inventors: Sharon T. Conn, Scottsdale, AZ (US); Amy Marie Silberbauer, Modesto, CA (US); Philip L. Boyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 11/021,898

(22) Filed: Dec. 22, 2004

(65) Prior Publication Data

US 2006/0136805 A1 Jun. 22, 2006

(51) Int. Cl.
G06F 17/00 (2006.01)
G06F 7/00 (2006.01)
G06F 15/00 (2006.01)

(52) U.S. Cl. .................. 707/103 R; 707/102; 715/500

(58) Field of Classification Search ............ 707/103 R, 707/102; 715/500
See application file for complete search history.

(56) References Cited

U.S. PATENT DOCUMENTS

| | | | |
|---|---|---|---|
| 5,627,979 A * | 5/1997 | Chang et al. ................. 715/763 |
| 5,699,310 A | 12/1997 | Garloff et al. |
| 6,199,195 B1 | 3/2001 | Goodwin et al. |
| 6,289,382 B1 | 9/2001 | Bowman-Amuah |
| 6,292,932 B1 | 9/2001 | Baisley et al. |
| 6,477,527 B2 | 11/2002 | Carey et al. |
| 2001/0051948 A1 | 12/2001 | Srinivasan et al. |
| 2002/0184264 A1 * | 12/2002 | Berg et al. ................... 707/513 |
| 2003/0058277 A1 * | 3/2003 | Bowman-Amuah ......... 345/765 |
| 2003/0084424 A1 * | 5/2003 | Reddy et al. ................. 717/105 |
| 2003/0110073 A1 | 6/2003 | Briel et al. |
| 2003/0135657 A1 * | 7/2003 | Barker et al. ................. 709/310 |
| 2003/0149934 A1 | 8/2003 | Worden |
| 2003/0163479 A1 * | 8/2003 | Mathews et al. ............ 707/102 |
| 2003/0208505 A1 | 11/2003 | Mullins et al. |

(Continued)

FOREIGN PATENT DOCUMENTS

EP 0 973 091 1/2000

(Continued)

OTHER PUBLICATIONS

Iyengar, Sridhar, et al., "Business Process Integration Using UML and BPEL4WS", SI-SE 2004, Zurich, Switzerland, Mar. 18-19, 2004, slides 1-60 (downloaded from: www.ifi.unizh.ch/groups/req/si-se/sise2004/Talk_Iyengar.pdf).*

(Continued)

*Primary Examiner*—John Breene
*Assistant Examiner*—Robert Stevens
(74) *Attorney, Agent, or Firm*—Janaki K. Davda; Konrad Raynes & Victor LLP

(57) ABSTRACT

Disclosed is a technique for manipulating instance data of a base model. A ViewType, a root object representing an object of the base model, and an operation are received. Whether the ViewType and the root object are compatible is determined. When the ViewType and the root object are compatible, the operation is applied to the instance data of the base model while using the ViewType to traverse the instance data.

5 Claims, 7 Drawing Sheets